United States Patent [19]

Meynard

[11] 4,343,847
[45] Aug. 10, 1982

[54] SEALING MEMBRANE WITH INCORPORATED LIMITED-SLIP SHEET AND ITS METHOD OF MANUFACTURE

[75] Inventor: Jean-Yves Meynard, Mondoubleau, France

[73] Assignee: Siplast S.A., Paris, France

[21] Appl. No.: 207,020

[22] Filed: Nov. 14, 1980

[30] Foreign Application Priority Data

Mar. 18, 1980 [FR] France .............................. 80 05994

[51] Int. Cl.³ ........................... B32B 3/10; B32B 3/08
[52] U.S. Cl. .................................... 428/139; 156/300; 428/143; 428/352
[58] Field of Search ................ 428/57, 137, 141, 143, 428/139, 140, 352; 156/304.3, 300

[56] References Cited

U.S. PATENT DOCUMENTS 2,270,734  1/1942  Kirschbraun ........................ 428/143
3,326,366  6/1967  Butterfield ........................... 206/59

FOREIGN PATENT DOCUMENTS 2506723  8/1975  Fed. Rep. of Germany .
2519226  11/1976 Fed. Rep. of Germany .
1560512  2/1969  France .
2364116  4/1978  France .

Primary Examiner—Paul J. Thibodeau
Attorney, Agent, or Firm—Weiser, Stapler & Spivak

[57] ABSTRACT

A carrier is coated with a suitable adhesive. That surface of the adhesive which is to be placed in contact with the support for the membrane is united with an assembly consisting of a film, and a sheet of material which does not bond to the film. The sheet is impermeable to the hot adhesive, and both film and sheet have perforations which are in substantial alignment. The sheet is positioned on the outside of the assembly, facing toward the support. The adhesive is exposed through the aligned perforations and provides continuity of material throughout the membrane. The imperforated portions of film and sheet can slide relative to each other, thus providing a so-called "limited-slip sheet" for the membrane. Preferably, the impermeable sheet is preperforated, while the perforations in the film are created by the heat of the adhesive, as both film and sheet are applied simultaneously with the coatings of the carrier by the adhesive. Variants which further improve the emplacement of the membrane on the support are also disclosed.

18 Claims, 7 Drawing Figures

SEALING MEMBRANE WITH INCORPORATED LIMITED-SLIP SHEET AND ITS METHOD OF MANUFACTURE

The present invention relates to improvements in sealing membranes, and particularly in such sealing membranes for roofing.

The behavior of a material upon a support which is subject to the formation of cracks can be partially described by the formula:

$$x \leq (\nu\epsilon)/(\tau)$$

in which:
 X is the amplitude of the cracking movement of the support;
 $\nu$ and $\epsilon$ respectively represent the stress and the elongation in the sealing membrane which is imparted by the movement of the crack; and
 $\tau$ is the adhesive force between the support and the membrane.

It is therefore apparent that one of the means for improving the behavior of a sealing material upon its support involved reducing the adhesive force $\tau$, so as to reduce the stress $\nu$ and elongation $\epsilon$ of the membrane.

This procedure, which involves bonding the membrane to its support at spaced-apart points, is widely used. Unfortunately it requires a labor force which is trained to position the bonding points uniformly and in adequate quantity. Also this labor force must be sufficiently numerous, because the time consumed in applying a sealing membrane by this method is much longer than for a conventional method, such as bonding the membrane to the entire surface by means of molten bitumen.

The idea has therefore arisen of incorporating into the sealing material a layer applied at the factory so as to achieve, using a conventional method of application, the advantages of the method which uses attachment at spaced points.

French Pat. No. 2,341,432 assigned to the same Assignee as the present application, contemplated such attachment at spaced points since it has as its object a slip sheet interposed between a support which is subject to cracking and a sealing membrane, in order to prevent rupture of this membrane under the influence of the support. It is characterized by being composed of two layers held against each other by slack stitching (preferably carried out by means of a polyester thread, each of these layers having an inward face (consisting, for example, of a polyester film) capable of sliding over the inward face of the other layer, and an outward face (consisting, for example, of a glass fabric). One of the outward faces is intended to be attached to the support which is subject to cracking and the other to the sealing membrane.

First Certificate of Addition No. 2,364,116 to the above-mentioned French patent relates to a slip sheet of the above-mentioned type, in which the inward surfaces of the two layers are formed of a film of heat-fusible material, while the slack stitching consists of a group of bonding points between these inward surfaces, obtained through heat bonding.

Second Certificate of Addition No. 2,383,780 to the same French patent relates to a slip sheet of the same general type, but in which each of the two layers consists of a single film or sheet having a low coefficient of friction (crepe paper, for example) and is attached to the other by means of dots of extraneous material having elasticity in shear, thereby enabling displacement of the two layers relative to each other.

Such arrangements have two characteristics which tend to make them expensive and unreliable:

1. The bonding between the sealing membrane and the support takes place by means of attachment points which do not have sufficient reliability. Indeed, under the action of the wind, the stitches (Pat. No. 2,341,432) easily rip the layers or films which constitute the slip sheet, and which they are supposed to connect. As for film attached to each other by heat bonding (Certificate of Addition No. 2,364,116) or by extraneous material (Certificate of Addition No. 2,383,780), these separate in their bonding plane under the influence of temperature changes and of dimensional changes of the support.

2. Manufacture of the layer composed of two films attached to each other by stitching, by heat bonding, or by extraneous material,
 (a) requires a fabricating procedure different from a conventional coating machine: a stitching machine, or a bonding machine, and/or
 (b) considerably reduces the efficiency of utilization of a conventional coating machine, because of the need to control the bonding of the films, or the deposition of the bonding material, or because of transfer of material from one machine to another.

It is an object of the present invention to overcome one or more of the foregoing drawbacks. Both a new membrane structure, and a new method of making that structure are objects of the invention.

These and other objects which will appear are achieved in accordance with the present invention as follows.

To this end, the sealing membrane according to the present invention and intended to be applied to a support subject to cracking and consisting of at least one carrier coated with a adhesive suitable for that purpose is essentially characterized in that, upon that face which is adapted to be in contact with the support subject to cracking, there is united an assembly consisting of a film and of a sheet of nonfusible or slightly fusible material which is not traversable by the hot adhesive. The said film and the said sheet are positioned toward the outside of the sealing membrane.

Arrangements can be made so that this assembly, which can also be referred to as a "limited-slip layer or sheet" be on the surface of the finished sealing membrane. However, it is preferred that it be immersed in the adhesive, the lower layer of the membrane being thus formed by a thin portion of adhesive.

In accordance with a first embodiment, this limited-slip sheet is composed of a sheet which has previously been perforated, which is not sensitive to heat and of a unperforated film which is sensitive to heat, the holes being produced automatically in that film during its coating with the hot adhesive.

In accordance with a second embodiment, the limited-slip sheet comprises two sheets which are preperforated and insensitive to heat.

To manufacture the sealing membrane comprising the limited-slip sheet in accordance with the above-mentioned first embodiment, there are placed against each other a continuous heat sensitive film and a perforated sheet.

In an operation which simultaneously also accomplishes the coating of the carrier, the assembly so formed is passed through the hot adhesive. By so doing, the continuous film loses all mechanical cohesion and becomes perforated at the same locations as the perforations in the sheet, while retaining its structural integrity only in those regions in which it is supported by the latter.

In the case of the second embodiment, the continuous heat sensitive film is replaced by a preperforated film which is not heat sensitive, this film as well as the sheet of material not traversable by the hot adhesive having been previously perforated by any known mechanical means, preferably simultaneously, just before their passage through the hot adhesive.

After cooling of the resulting structure, there is obtained a sealing membrane whose true attachment surface to the support is limited to the area of the perforations provided in the sheet of the film-plus-sheet assembly.

In comparison with the techniques described in French Pat. No. 2,341,432 and in Certificates of Addition No. 2,364,116 and No. 2,383,780, in the structure embodying the present invention there is no sewing thread, nor extraneous bonding spots, nor heat bonding. The structure is remarkable in that, in the true areas of attachment of the sealing membrane to the support, there is a complete continuity of a substance between that support and the sealing membrane itself. This continuity of the same substance, which had in reality never been achieved by means of the above-described prior art structures, insures that attachment will remain secure over time.

Moreover, even though the true attachment of the membrane to the support is carried out by the adhesive only in the regions of the apertures in the limited-slip assembly, the capability of adhesion of this membrane remains complete because one can go so far as to provide atttachment through adhesion of the membrane over its entire surface to the support subject to cracking.

The present invention also has as its object an inproved sealing membrane of the same type of assembly as previously described and characterized in that a width of this membrane is divided into two regions, a region A comprising the assembly described above and another region B a surface finishing layer. This is done in such manner that, upon application of successive widths, the region B of one width completely covers the region A of the preceding width.

In the finished protective structure composed of a plurality of these membranes positioned side-by-side, all the regions A are therefore on the bottom and the regions B on the top.

Thus, with a single material, there is achieved a two-layer assembly with all of the advantages which pertain to this type of assembly:
 reliability of application;
 separation of the functions of the two layers, the surface one resisting attack by the elements and the bottom one resisting movements of the support,
and having all of the advantages of a single-layer assembly:
 reduced labor;
 no risks of errors in the supply of the sealing material in the sense that membranes of a single type are utilized;
 greater uniformity of the resulting finished product which is entirely made at the factory; and
 greater installation reliability for the installer, who does not have to go back to a surface which has already been covered by a first layer in order to apply a second one to it, the ultimate protection of the support subject to cracking being completed progressively as the job progresses.

In addition, the present invention makes it possible to overcome the problem of classical interruptions (overnight, over weekends) between the installation of different components of a multilayer membrane, interruptions during which meterological effects (humidity, wind, temperature) can degrade the installed components, thereby damaging the good quality of the assembly.

In what follows there are described in more detail, by way of illustration and without limitation, specific embodiments of a sealing membrane comprising a limited-slip sheet united in accordance with the present invention, referring to the accompanying drawings in which:

FIGS. 1 and 2 each illustrate a partial sectional view of an embodiment of the material constituting this membrane.

Figure 1:
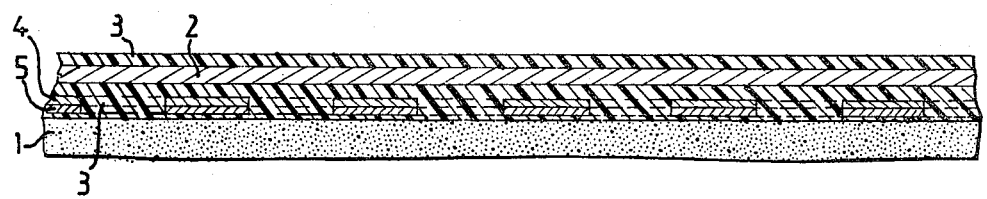
Figure 2:
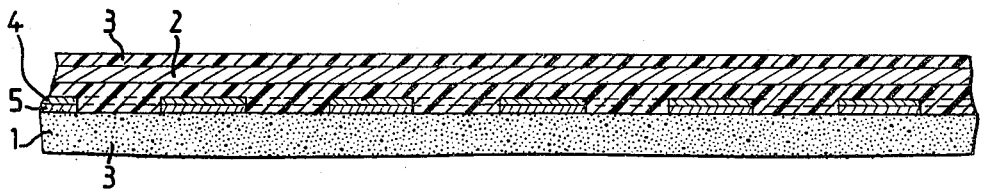

As can be seen from FIGS. 1 and 2, the sealing material according to the invention consists of the following successive layers starting from the surface exposed to the atmosphere and going toward the support 1, which may be a concrete roof, to which it will be attached:
 at least one carrier 2 (glass, polyester or jute fabric, glass or polyester netting, polymeric film) enveloped on both surfaces by an adhesive 3 (bituminous, polymeric, bituminouspolymeric);
 a film 4, which is perforated in the sealing membrane ready for use;
 a sheet 5 which is a perforated sheet made of a material resistant to 200° C. and insensitive to the action of the hot adhesive 3 (bitumen), such as paper, glass, felt, polyester felt, polyester films.

The sealing membrane may comprise a finishing layer not shown in FIG. 1.

The carrier 2, which is immersed in the adhesive 3, in principle is located at the center of the finished membrane, however, it may also be closer to the surface opposite support 1, and may even just touch that surface.

The perfect alignment of the perforations in layers 4 and 5 is not essential. A misalignment is permissible which may amount even to 15 to 25% measured in the direction of misalignment.

The film 4 may be made of a material which is fusible at 200° C. and which does not adhere to sheet 5. As examples of such materials, there is given polyethylene, polypropylene, PVC, etc., in film or non-woven form.

The film 4 may also be a pre-perforated film made in the same manner as sheet 5.

In the finished sealing membrane, the limited-slip sheet 4, 5 is preferably completely immersed in the adhesive 3, which forms a thin, continuous lower layer (FIG. 1) or else the adhesive 3 traverses the apertures facing film 4 and sheet 5 to reach the surface of support 1 (FIG. 2).

The film 4 and the sheet 5 are made or impregnated with materials known in themselves in such manner that they cannot bond to each other. Thus, sheet 5 may be treated with an antiadhesion agent.

Assembly of the limited-slip sheet 4, 5 is carried out simultaneously with coating with the hot adhesive 3 of carriers 2. During performance of this conventional operation by means of a coating machine, the heat sensitive film 4, not perforated, and the sheet 5 which is nonadhesive to film 4, and which are perfectly placed one against the other, are also caused to pass through the hot adhesive 3 (200° C.) in order to produce structures such as illustrated in FIGS. 1 and 2; there the film 4 opens up at locations where it is not supported by sheet 5. In case a pre-perforated film 4 is used, i.e. one made of a material resistant at 200° C. and insensitive to the action of the hot adhesive, it is advantageous to simultaneously perform the perforation of the film 4 and the sheet 5 by conventional process, before their passage through the hot adhesive.

The sealing membrane according to the present invention makes it possible to achieve a structure (1) with complete transverse continuity of a single substance, namely adhesive 3, from the support 1 all the way to the surface most remote from that support, and (2) with numerous locations in the interior of that substance in which there is possible movement of the membrane in a direction parallel to support 1. Indeed, in those locations where sheet 5 has not been pre-perforated and where film 4, as the case may be, has remained intact during fabrication of the membrane or has not been pre-perforated, this film 4 is capable of "sliding" relative to sheet 5, and thereby absorbing or compensating for the cracking movements of support 1 which could rupture the sealing membrane. It is noted that such a sliding is normally limited because it takes place only at spaced points and to a slight degree, to only a few millimeters. If, by chance, the support were to open up by several tens of millimeters, the attachment points of the seal to the support would break on one side and the other of the crack over a few centimeters, thus permitting complete diffusion of the stress produced by the support.

Installation of the sealing membrane according to the invention, may be carried out by conventional processes, particularly by application to a thin layer of hot asphalt spread upon support 1, by heating of that face which is intended to be applied to the support 1 and which is covered by a gravel or talc, particularly in the case in which assembly 4, 5 is immersed in adhesive 3, or else by bonding if the adhesive 3 of the lower layer of the membrane causes the latter to be sufficiently adhesive itself, that layer having previously been covered with an adhesive protection paper (silicone paper).

The support consists of a mechanical carrying portion of concrete, wood or steel which may be covered with heat-insulating panels.

Figure 3:
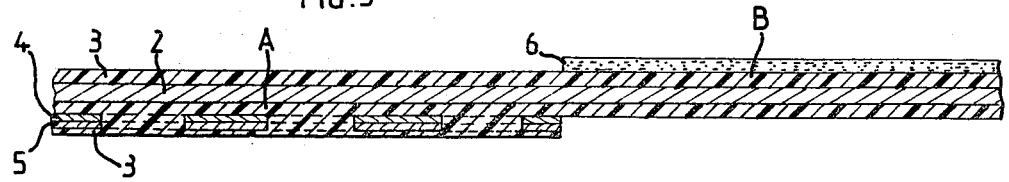
FIGS. 3 to 6 are partial sectional views of four embodiments of a sealing membrane of the same construction as FIG. 1, but including an additional improvement.

FIG. 3 shows, in partial cross-section, an improved sealing membrane which it is convenient to show in rolls. The uniqueness of this membrane is that it is divided, in its width, into two regions, the first region A comprising the limited-slip sheet 4, 5 and a second region B a surface finishing layer 6 (colored ceramic granules, metallic foil, etc.). The width of region B is at least equal to that of region A.

Figure 4:
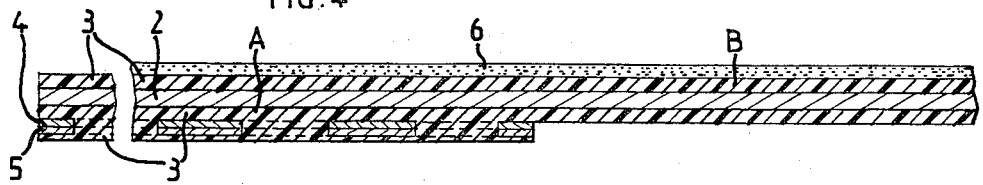
Figure 5:
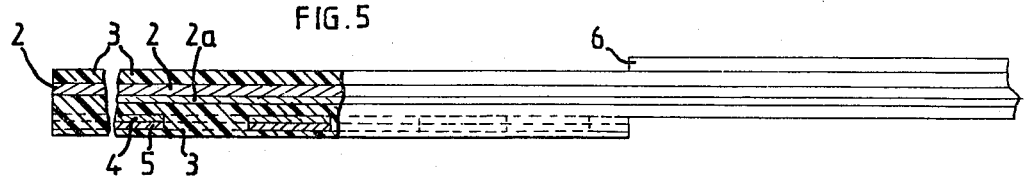
Figure 6:
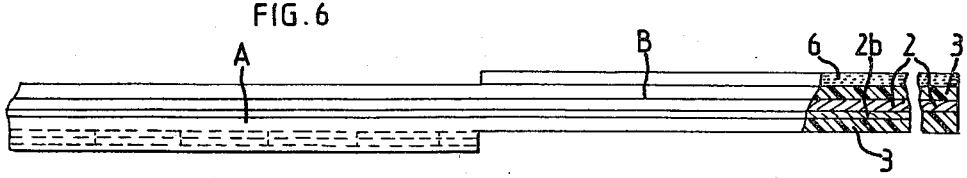

It can also be contemplated to mechanically reinforce this membrane in the area in which the regions A and B join, where it is subject to cutting forces in the vertical direction. Such a reinforcement positioned in this junction area over a width of approximately 10 cm, may be constituted either by the metallic film which forms the finishing layer 6 and which is extended to cover region A (FIG. 4) or by a supplemental carrier which is positioned in the junction area of region A and region B, or by a carrier 2a or 2b respectively present in region B or in region A for some other reason, which is then extended respectively into region A (FIG. 5) or into region B (FIG. 6).

Figure 7:
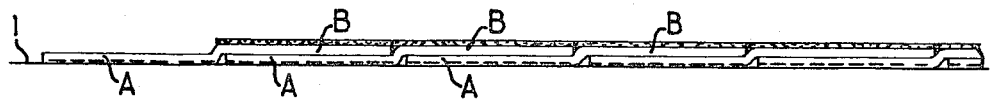
FIG. 7 shows in diagrammatic form a protective structure produced utilizing membranes of the type of those of FIGS. 3 to 6.

By the application of successive widths of such a material, with the region B providing complete coverage of the region A of the preceding width, there is obtained the overall assembly shown in FIG. 7, whose advantages have been pointed out above. To clarify the drawing, there has been intentionally accentuated the folding of each of these widths, but in reality in view of their slight thickness (3 to 4 mm approximately), these widths rest one upon the other, each of them being practically horizontal. If region B is wider than region A, there will be coverage of two regions B adjacent in the resulting structure. Moreover, it is well understood that the embodiments of the present invention which have been described above by reference to the accompanying drawings have been provided by way of illustration and without limitation and that modifications may be made therein without departing from the scope of the present invention.

I claim:

1. A sealing membrane intended for application to a support subject to cracking and having at least one carrier enveloped in a suitable adhesive, said sealing membrane being characterized in that upon that face which is adapted to be in contact with the support subject to cracking, there is united an assembly comprising a film and a sheet of material which is not fusible or only slightly fusible and nontraversable by the hot adhesive, said film and sheet being superposed and having aligned perforations and being such that they do not bond to each other, said sheet being positioned toward the outside of the sealing membrane, and the adhesive extending through said perforations in both film and sheet.

2. The sealing membrane of claim 1 wherein the asembly is situated in the adhesive on one side of the carrier in such position that the lower-most layer of the membrane is formed of a thin layer of adhesive.

3. The sealing membrane of claim 1 wherein the assembly is situated in the adhesive on one side of the carrier in such manner that the lower-most layer of the membrane is formed of the sheet and of the adhesive in the perforations in the sheet.

4. The sealing membrane of claim 1 wherein the film is made of a continuous material which melts at the temperature of the hot adhesive.

5. The sealing membrane of claim 4 wherein the film is made of a material which melts at 200° C.

6. The sealing membrane of claim 5 wherein the film is made of a material selected from the group consisting of polyethylene, polypropylene, and PVC.

7. The sealing membrane of claim 1 wherein the film is perforated and of the same composition as the sheet material.

8. The sealing membrane of claim 1 wherein the said sheet is made of a material which is heat resistant to 200° C.

9. The sealing membrane of claim 8 wherein
the sheet is made of a material selected from paper, glass felt, and polyester films.

10. The sealing membrane of claim 1 wherein
the said film and the said sheet are made of materials or impregnated with materials which are such that the film and sheet do not bond to each other.

11. The sealing membrane of claim 10 wherein
the said sheet is treated with an anti-adhesive medium.

12. A sealing membrane intended for application to a support subject to cracking and comprising at least one carrier enveloped by a suitable adhesive and characterized in that
one width of the said membrane is divided into two regions, one region A comprising the assembly as defined in claim 1, and the other region B comprising a surface finishing layer,
such that upon application of successive widths, the region B of one width completely covers the region A of the preceding width.

13. The sealing membrane of claim 12 wherein
the width of the region B is at least equal to that of the region A.

14. The sealing membrane according to claim 12 wherein
the surface finishing layer is made of metal film or of ceramic granules.

15. The sealing membrane of claim 12 characterized in that
it is mechanically reinforced in the area of junction of regions A and B.

16. The sealing membrane of claim 15 wherein
the reinforcement is provided by the metallic film forming the finishing layer and which is extended so that it covers the region A.

17. The sealing membrane of claim 15 wherein
the reinforcement is provided by a supplemental carrier positioned in the junction area between region A and region B.

18. The sealing membrane of claim 15 wherein
the reinforcement consists of a supplemental carrier present in one of said regions and which is extended into the other region.

* * * * *